United States Patent [19]
Venolia

[11] Patent Number: 5,463,722
[45] Date of Patent: Oct. 31, 1995

[54] AUTOMATIC ALIGNMENT OF OBJECTS IN TWO-DIMENSIONAL AND THREE-DIMENSIONAL DISPLAY SPACE USING AN ALIGNMENT FIELD GRADIENT

[75] Inventor: Daniel S. Venolia, Foster City, Calif.

[73] Assignee: Apple Computer, Inc., Cupertino, Calif.

[21] Appl. No.: 96,629

[22] Filed: Jul. 23, 1993

[51] Int. Cl.$^6$ .................................................. G06T 17/00
[52] U.S. Cl. ...................... 395/133; 395/119; 395/155; 345/157
[58] Field of Search ........................ 395/119, 120, 395/121, 122, 133–139, 155, 161; 345/157, 158, 163, 164; 364/559, 496

[56] References Cited

U.S. PATENT DOCUMENTS

| | | | |
|---|---|---|---|
| 4,328,553 | 5/1982 | Fredriksen et al. | 364/559 |
| 4,754,267 | 6/1988 | Reynolds et al. | 340/709 |
| 4,812,829 | 3/1989 | Ebina et al. | 340/709 |
| 5,095,303 | 3/1992 | Clark et al. | 345/164 |
| 5,132,672 | 7/1992 | Clark | 345/164 |
| 5,146,212 | 9/1992 | Venolia | 340/709 |
| 5,237,647 | 8/1993 | Roberts et al. | 395/119 |
| 5,249,137 | 9/1993 | Wilson et al. | 364/496 |
| 5,293,529 | 3/1994 | Yoshimura et al. | 345/158 |

OTHER PUBLICATIONS

Venolia, D., "Facile 3D Direct Manipulation", Upcoming in *Proc. CHI '93* (Amsterdam, May 1993), ACM/SIGCHI, 1993, 31–36.

Bier, E., "Skitters and Jacks: Interactive 3D Positioning Tools", In *Proc. Workshop on Interactive 3D Graphics* (Chapel Hill, N.C., Oct. 1986). ACM/SIGGRAPH, 1986, 183–196.

Bier, E., "Snap–Dragging in Three Dimensions", In *Proc. Workshop on Interactive 3D Graphics* (Snowbird, Utah 1990). ACM/SIGGRAPH, 1990, 193–204.

Bier, E., and Stone, M., "Snap–Dragging", In *Computer Graphics* vol. 20, No. 4 (Aug. 1986), 233–240.

Glassner, A. S., "Space Subdivision for Fast Ray Tracing", *IEEE CG&A*, (Oct. 1984), 15–22.

Baumgart, B. G., *Winged–Edge Polyhedron Representation*, Technical Report STAN–CS–320, Computer Science Department, Stanford University, Palo Alto, Calif., (1972), 1–46.

Gaver, W., "Auditory Icons: Using Sound In Computer Interfaces", *Human Computer Interaction* vol. 2, No. 2, (1986), 167–177.

Baraff, D., "Analytical Methods For Dynamic Simulation Of Non–Penetrating Rigid Bodies", *Computer Graphics*, vol. 23, No. 3 (Jul. 1989), 223–232.

Moore, M., and Wilhelms, J., "Collision Detection and Response For Computer Animation", *Computer Graphics*, vol. 22, No. 4 (Aug. 1988), 298–298.

*Primary Examiner*—Almis R. Jankus
*Attorney, Agent, or Firm*—V. Randall Gard

[57] ABSTRACT

A method and apparatus for automatic alignment of manipulated objects in two-dimensional and three-dimensional graphic space. The present invention provides an alignment field gradient which emanates from objects surrounding the manipulated object(s). As a user manipulates an object, the present invention attracts the manipulated object into an aligned position and orientation with another object(s) in the displayed three-dimensional display space. The present invention provides alignment of all combinations of vertices, edges and planar faces for three-dimensional polyhedral objects and for all combinations of vertices and edges for two-dimensional polygonal objects.

34 Claims, 7 Drawing Sheets

AUTOMATIC ALIGNMENT OF OBJECTS IN TWO-DIMENSIONAL AND THREE-DIMENSIONAL DISPLAY SPACE USING AN ALIGNMENT FIELD GRADIENT

FIELD OF THE INVENTION

The present invention relates generally to computer graphics and in particular to an alignment field gradient exerted by objects surrounding an object displayed in a two-dimensional (2D) or three-dimensional (3D) graphical display space appearing on a computer screen.

SUMMARY OF THE RELATED TECHNOLOGY 2D and 3D computer graphics have provided a new paradigm which is the foundational aspect of many modern design methodologies. Computer graphics have enabled the development of new design methodologies such as computer aided design (CAD). CAD is particularly useful, for example, to architects in creating an architectural plan for a building and to design engineers in drawing engineering prototypes such as new automobiles.

CAD provides for the creation of digital representations of figures which previously had to be drawn by hand. Moreover, computer-aided designs created on a computer can be stored in a library existing in computer memory. A user can recall entire designs from the computer library to utilize as a starting point for creating new designs. A design engineer can create a design for a new prototype more rapidly by utilizing building blocks from the CAD computer library, without having to recreate them. Thus, CAD enables a user to rapidly create graphical representations of a design.

CAD, and computer graphics in general, enable a user to rapidly draw and manipulate figures rendered in two and three dimensions on a computer display. Typical computer graphics applications provide a graphical user interface to enable the user to manipulate displayed graphical design objects. The typical graphical user interface comprises a keyboard from which a user initiates positioning commands to control location of design objects in display space. Keyboard commands, however, are cumbersome to utilize. Thus, a need developed for a more direct method of manipulation of graphical objects via the graphical user interface. Direct manipulation may be achieved, for example, by a graphical object controller or pointing device, such as a mouse-driven or trackball controlled cursor, to select and manipulate an object to a desired location in the display space.

Thus, utilizing direct manipulation, a design engineer can rapidly create a design for a new automobile by manipulating the fundamental pieces of the design by initiating commands through the graphical user interface. For example, a design engineer can lay the foundation for a new car design by recalling a chassis and a set of wheels from a computer library. The engineer can then manipulate these design objects into place via a pointing device so that the wheels are properly positioned on the chassis. An architect can recall windows and doors from the computer library and place them into an architectural plan for a building by manipulating the design objects via the graphical user interface.

In manipulating graphical design objects, it is important that they be properly positioned in relation to one another. For example, the bottom of a window should generally be parallel with the floor in an architectural plan. Thus, some form of alignment operation or command is typically provided in a computer graphical application. Moreover, typical direct manipulation methods, particularly when aligning one object to another, are cumbersome and difficult to utilize. Typical user interface methodologies require a user to initiate a complex set of alignment commands in order to manipulate design objects into alignment in display space. Moreover, the typical alignment methodology utilizes a ruled reference grid superimposed over the computer display of the design. The ruled grid presents a set of vertical and horizontal intersecting lines which aid the user in aligning graphical design objects.

There are some fundamental problems presented by the ruled grid. The grid restricts the designer's expressiveness. The designer may become preoccupied with the alignment grid, and thus unable to divorce himself from the grid in order to fully concentrate on the design process. In that event, he would be unable to freely manipulate the design objects. Moreover, the alignment commands utilized with the alignment grid unnecessarily complicate the interface.

Another typical alignment methodology is to introduce additional alignment objects, such as those provided by the "guides" paradigm, and popularized by graphical applications such as PageMaker, by Aldus Corporation of Seattle, Wash., and Eric Bier's "jacks". These alignment objects introduce a third object between two objects, wherein the third object is an intermediate alignment object between the manipulated object and the object to which it is being aligned, thus introducing an intermediate level of control between the user and the design objects in the design display space. Thus, the user is again encumbered by an alignment paradigm which introduces an unnecessary level of indirect control into the graphical user interface. An alignment object is presented which is not part of the desired result. The alignment object must be introduced to mediate alignment. The guides methodology complicates the graphic user interface, thus reducing the user's ability to freely express his design via the interface.

Another typical graphical alignment technique utilizes what is commonly referred to as "gravity fields" or "snap-dragging." The gravity fields and snap-dragging paradigms utilize objects that appear in a scene as the alignment points themselves. For example, commercial applications such as Ashlar Vellum, by Ashlar, Inc. of Sunnyvale, Calif., and Claris CAD, by Claris Corporation of Santa Clara, Calif., utilize existing objects in the scene as alignment points.

The gravity fields or snap-dragging technique suffers from drawbacks as well. When a manipulated display object approaches an alignment position (an object being aligned to), instead of smoothly and continuously approaching the desired position, the manipulated object jumps to the alignment point. These abrupt movements are caused by the hard, fixed alignment threshold boundaries surrounding an alignment object. When a manipulated object moves within the hard boundary of an alignment object's boundary line or alignment threshold, the manipulated object abruptly jumps to the alignment point associated with the alignment boundary.

These abrupt movements introduce visual discontinuity into the manipulated object's motion. These abrupt movements also make it difficult for a designer to move the manipulated object close to, but not touching, an alignment point. The manipulated object jumps to the alignment point once it comes within a set boundary of the alignment point's region of influence. Moreover, if several alignment points are clustered close together, a small movement of the user's cursor, which controls movement of the manipulated object, may result in the manipulated object unpredictably or erratically jumping between alignment points.

Finally, all of the known typical graphical alignment techniques suffer from a common malady; they are inappropriate when utilized in three-dimensional displays. A 3D alignment grid overlaid in 3D display is unwieldy. Additional alignment objects displayed in 3D are cumbersome to utilize. The abrupt movements caused by hard alignment boundaries are particularly cumbersome in 3D. Moreover, these techniques are most appropriate when utilized to align points, rather than whole objects as is necessary in 3D space.

SUMMARY OF THE PRESENT INVENTION

The present invention provides an automatic alignment field gradient which overcomes many of the difficulties manifest in typical graphic alignment methodologies. The method and apparatus of the present invention does not complicate the user interface with extraneous modes, commands, or dialogs as used in the typical systems of the past. The present invention provides enhanced expressiveness to the user by providing objects which can be freely manipulated by the user without the undesirable encumbrance of grids and hard alignment thresholds. Moreover, the method and apparatus of the present invention are transparent to the user. In the present invention, no extraneous objects appear in the scene. The only visual evidence of the method and apparatus of the present invention's operation are intermittent markers which enhance the user's ability to correctly manipulate objects into their desired alignment position.

The influence of the method and apparatus of the present invention is gradual, provided as a gradient, so that the motion of the manipulated object is visually continuous, rather that jumping into alignment as do typical systems as discussed above. Moreover, the method and apparatus of the present invention enables the user to align any of a multitude of an object's displayed surface features comprising vertices, edges, and faces with any other object's displayed surface features. In the present invention, the burden of alignment is removed from the user and placed on the computer.

The present invention provides a method for automatically aligning a first object to a second object in a computer system comprising a processor, memory, display and graphic object controller, the method comprising displaying the first object and the second object on the computer display, displaying a cursor coupled to the graphic object controller on the computer display, selecting with the cursor coupled to the graphic object controller the first object displayed on the computer display, manipulating with the graphic object controller the first object displayed on the computer display towards the second object displayed on the computer display, providing an alignment field gradient emanating from the second object and aligning the first object to the second object in accordance with the alignment field gradient.

The present invention also provides a method for automatically aligning a first object to a second object wherein the step of aligning starts when the first object is manipulated with the graphic object controller to within a first predetermined distance from the second object and finishes when the first object is manipulated with the graphic object controller to within a second predetermined distance from the second object wherein the second predetermined distance is smaller than the first predetermined distance.

The present invention also provides a method for automatically aligning a first object to a second object wherein the step of aligning further comprises displacing the position of the first object from the position of the cursor coupled to the graphic object controller according to a strength of the alignment field gradient.

The present invention also provides a method for automatically aligning a first object to a second object wherein the step of aligning the first object to the second object comprises aligning one feature of the first object to one feature of the second object wherein a feature can be any element of the set comprised of an object's vertices and edges in the case of a two-dimensional object and vertices, edges and faces in the case of a three-dimensional object.

The present invention also provides a method for automatically aligning a first object to a second object wherein vertex features are aligned before edge features and edge features are aligned before face features.

The present invention provides an apparatus for automatically aligning a first object to a second object in a computer system comprising a processor, memory, display and graphic object controller, the apparatus comprising means for displaying the first object and the second object on the computer display, means for displaying a cursor coupled to the graphic object controller on the computer display, means for selecting with the cursor coupled to the graphic object controller the first object displayed on the computer display, means for manipulating with the graphic object controller the first object displayed on the computer display towards the second object displayed on the computer display, means for providing an alignment field gradient emanating from the second object, and means for aligning the first object to the second object in accordance with the alignment field gradient.

The present invention also provides an apparatus for automatically aligning a first object to a second object wherein the means for aligning starts aligning the first object to the second object when the first object is manipulated with the graphic object controller to within a first predetermined distance from the second object and finishes aligning the first object to the second object when the first object is manipulated with the graphic object controller to within a second predetermined distance from the second object wherein the second predetermined distance is smaller than the first predetermined distance.

The present invention also provides an apparatus for automatically aligning a first object to a second object wherein the means for aligning further comprises means for displacing the position of the first object from the position of the cursor coupled to the graphic object controller according to a strength of the alignment field gradient.

The present invention also provides an apparatus for automatically aligning a first object to a second object wherein the means for aligning the first object to the second object comprises means for aligning one feature of the first object to one feature of the second object wherein a feature can be any element of the set comprised of an object's vertices and edges in the case of a two-dimensional object and vertices, edges and faces in the case of a three-dimensional object.

The present invention also provides an apparatus for automatically aligning a first object to a second object wherein the means for aligning one feature of the first object to one feature of the second object aligns vertex features before edge features and aligns edge features before face features.

The present invention provides a method for aligning a displayed representation of an object comprising the steps of, displaying a representation of a first object in an initial position on a display screen under the control of a processor, displaying a representation of a second object on a display screen under the control of a processor, moving the representation of the first object toward the second object in a visually continuous manner using a cursor whose position is controlled by a cursor movement mechanism, calculating a current position for the first object which is displaced from a cursor dictated position by an amount which is determined as if the first object was under the gradual influence of an alignment field emanating from the second object, and displaying a representation of the first object on the display screen in the current position.

The present invention provides an apparatus for aligning a displayed representation of an object comprising means for displaying a representation of a first object in an initial position on a display screen under the control of a processor, means for displaying a representation of a second object on a display screen under the control of a processor, means for moving the representation of the first object toward the second object in a visually continuous manner using a cursor whose position is controlled by a cursor movement mechanism, means for calculating a current position for the first object which is displaced form a cursor dictated position by an amount which is determined as if the first object was under the gradual influence of an alignment field emanating from the second object, and means for displaying a representation of the first object on the display screen in the current position.

The present invention also provides a method for automatically aligning a first object to a second object in a computer system comprising a processor, memory, display and graphic object controller, the method comprising displaying the first object and the second object on the display of the computer system, displaying a cursor coupled to the graphic object controller on the display of the computer system wherein the cursor defines a cursor position on the display of the computer system, selecting with the cursor coupled to the graphic object controller the first object displayed on the display of the computer system, manipulating with the graphic object controller the selected first object displayed on the display of the computer system, providing an alignment field gradient emanating from the second object displayed on the display of the computer system, and aligning the manipulated first object displayed on the display of the computer system with the second object displayed on the display of the computer system wherein when the manipulated first object is manipulated with the graphic object controller to within a first predetermined distance from the second object the displayed location of the manipulated first object on the display of the computer system is gradually shifted away from the cursor position and towards the displayed location of the second object on the display of the computer system and when the manipulated first object is manipulated with the graphic object controller to within a second predetermined distance from the second object the displayed location of the manipulated first object on the display of the computer system is gradually shifted away from the cursor position and into alignment with the displayed location of the second object on the display of the computer system.

The present invention also provides an apparatus for automatically aligning a first object to a second object in a computer system comprising a processor, memory, display and graphic object controller, the apparatus comprising means for displaying the first object and the second object on the display of the computer system, means for displaying a cursor coupled to the graphic object controller on the display of the computer system wherein the cursor defines a cursor position on the display of the computer system, means for selecting with the cursor coupled to the graphic object controller the first object displayed on the display of the computer system, means for manipulating with the graphic object controller the selected first object displayed on the display of the computer system, means for providing an alignment field gradient emanating from the second object displayed on the display of the computer system, and means for aligning the manipulated first object displayed on the display of the computer system with the second object displayed on the display of the computer system wherein when the manipulated first object is manipulated with the graphic object controller to within a first predetermined distance from the second object the displayed location of the manipulated first object on the display of the computer system is gradually shifted away from the cursor position and towards the displayed location of the second object on the display of the computer system and when the manipulated first object is manipulated with the graphic object controller to within a second predetermined distance from the second object the displayed location of the manipulated first object on the display of the computer system is gradually shifted away from the cursor position and into alignment with the displayed location of the second object on the display of the computer system.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PRESENT INVENTION

Figure 1:
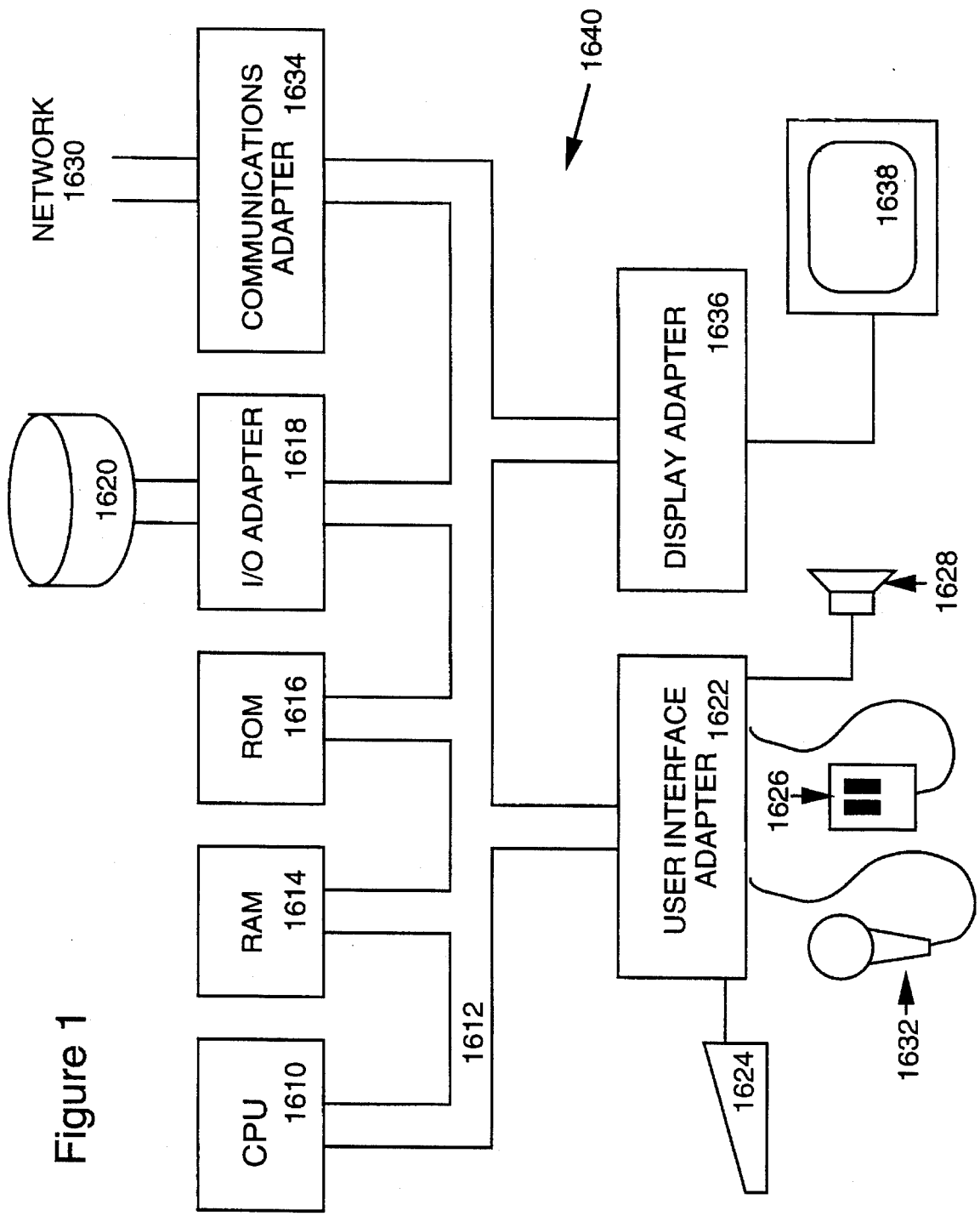
FIG. 1 illustrates a preferred hardware embodiment of the present invention.

Referring now to the drawings, a representative hardware environment for the present invention is depicted in FIG. 1, which illustrates a suitable hardware configuration of a computer system 1640 in accordance with the present invention. The computer system 1640 comprises a central processing unit 1610, such as a conventional microprocessor, and a number of other devices interconnected via a computer system bus 1612. The computer system 1640 further comprises a random access memory (RAM) 1614, a read only memory (ROM) 1616, an input/output (I/O) adapter 1618 for connecting peripheral devices such as nonvolatile memory devices such as disk units 1620 to bus 1612, a user interface adapter 1622 for connecting a keyboard 1624, a graphic object controller 1626 such as a mouse, a speaker 1628, a microphone 1632, and/or other user interface devices (not illustrated) to the bus 1612. The computer system 1640 may also comprise a communications adapter 1634 for connecting the bus 1612 to a data processing network 1630 (not illustrated) and a display adapter 1636 for converting the display information from the bus 1612 to video information to drive a display device 1638.

In a preferred embodiment, a Macintosh Quadra 950 computer manufactured by Apple Computer, Inc. of Cupertino, Calif., may be utilized. In a preferred embodiment, the present invention provides a three-axis mouse as the graphical object controller for use with the graphical user interface. The present invention utilizes the Macintosh computer system and the mouse to enable a user to manipulate and automatically align objects appearing on the computer display screen. The manipulated objects appear as objects in 2D and 3D display space which may be compiled into an aggregation of objects viewed together as a display scene.

Users can utilize the 3D mouse to move objects to their approximate desired positions after which the present invention provides assistance in order to attain more exact object positioning (orientation and alignment). Additional means are thus provided by the present invention to precisely and automatically align a manipulated object with other objects which are displayed adjacent the manipulated object in a two-dimensional or three-dimensional display space.

The alignment method and apparatus of the present invention enables the designer to freely manipulate objects in display space without reducing the available expressiveness. The alignment method and apparatus of the present invention does not clutter the interface with unnecessary alignment commands and objects which typically increase the complexity of the graphic user interface. The present invention also enables a user to align an object under the influence of an alignment field gradient. This is accomplished by manipulating an object close to a second object so that as the manipulated object comes within a region occupied by an alignment influence field gradient of the second object, the gradient gradually affects the alignment of the manipulated object. The effect of the alignment field on the manipulated object is gradual in that the effect becomes stronger as the manipulated object gets closer to the stationary object.

MAGNETIC ATTRACTION BETWEEN DISPLAY OBJECTS

In a preferred embodiment, the automatic alignment method and apparatus of the present invention is based on a model of magnetic attraction between two objects. Objects in the present invention are attracted to each other, just as a magnet is attracted to the metal door of a refrigerator. For example, a magnet can be moved freely around the kitchen, but, when the magnet moves close to a metal object, such as a refrigerator door, the natural magnetic influence of the magnet attracts the magnet to the door.

In a preferred embodiment, the magnetic attraction alignment field is implemented as a gradient. The magnetic attraction and associated alignment influence of the field emanating from an alignment object becomes stronger as a manipulated object approaches the alignment object, similarly to the magnetic attraction of a magnet becoming stronger as it moves closer to the metal refrigerator door.

In a preferred embodiment, alignment may be made with respect to any feature (face, edge or vertex) of an object. Just as with a magnet having a thin rectangular shape, all features of the magnet, the planar faces, the edges, and the corners are attracted to the refrigerator door.

Moreover, just as any one of the magnetic surfaces may contact the door, any surface on a manipulated object may contact another object. The rectangular magnet or an object in the alignment field gradient will be positioned so that its corner (vertex), its edge, or the front and back planar faces of the magnet or object may contact the door or another object when desired. The alignment field gradient of the present invention emulates the magnet's surface contacting the door, which can also slide around on the door's surface, within the two-dimensional plane of the door's face, without losing contact. The present invention also emulates rotation on the two-dimensional plane of the door without losing contact with it. Further, the present invention emulates the behavior of the magnet which can be gradually removed from contact with the door to terminate contact between the magnet and the door.

In a preferred embodiment, objects appearing in a display scene exert a gradual alignment influence on a manipulated object. The alignment influence exerted on manipulated objects by other objects appearing in the display scene is in effect by default unless it is disabled by the user. Thus, the method and apparatus of the present invention emulates the ever-present natural attraction between magnets and metal objects.

The alignment field gradient of the present invention aids a user in aligning objects. Thus, just as a person holding a refrigerator magnet does not have to issue alignment commands to ensure that the magnet is touching the door, or that the planar faces of the magnet and the door are parallel when in contact, a user does not have to initiate alignment commands to align objects in display space or to insure that the objects are parallel when in contact.

The method and apparatus of the present invention emulates the magnetic attraction between objects so that an object may be automatically aligned without extraneous user intervention. The operation of the present invention is highly intuitive thus making it easy to comprehend with little or no explanation required. Intuitive comprehension is aided by the visual and aural feedback provided by the preferred embodiment of the present invention. This feedback enables a user to intuitively and spontaneously comprehend and utilize the alignment field gradient paradigm.

In a preferred embodiment, the alignment influence is gradual and continuous within a region of influence surrounding an alignment object. The user interface is uncluttered and unfettered by additional alignment objects and cumbersome alignment commands. Just as a magnet can be placed anywhere in a kitchen, including arbitrarily close to a refrigerator door, a manipulated object in a display scene can be placed arbitrarily close to another object. The present invention does not restrict the user with alignment grids or by hard alignment thresholds. The user's expressiveness is enhanced. The user may freely manipulate objects using the transparent interface provided by the present invention.

The characteristics of the alignment field gradient are incorporated into the behavior of the objects displayed and manipulated utilizing the method and apparatus of the present invention in a preferred embodiment. Moreover, the present invention is appropriate for use in a 2D or a 3D direct manipulation graphical editor.

In the preferred embodiment method and apparatus of the present invention, a manipulated object, chosen by pressing and holding down a mouse button, becomes "metallic" and all the other objects in a scene become "magnetic." Thus, a manipulated object is attracted to nearby objects in the display scene by the alignment field gradient. The manipulated object may be automatically aligned with a nearby object under the influence of the alignment field gradient.

MANIPULATION OF OBJECTS

Figure 2:
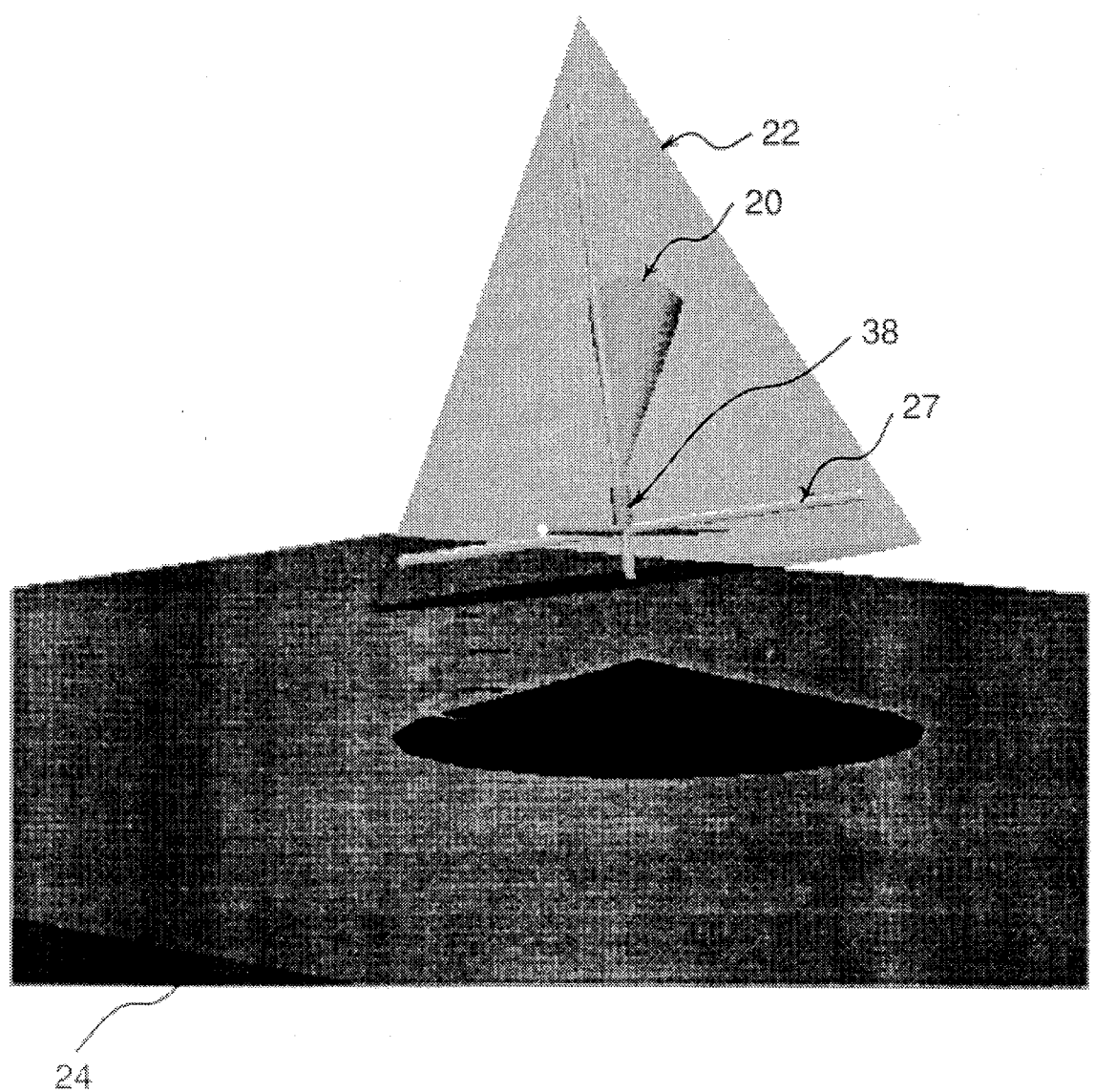
FIG. 2 is an illustration showing how, in a preferred embodiment, as the user drags one object toward another object the first object is drawn into alignment with the second object.

A preferred embodiment enables a user to translate and rotate objects in three dimensions by direct manipulation. FIG. 2 illustrates a portion of a display screen in a preferred embodiment of the method and apparatus of the present invention. A cone-shaped cursor 20, an object 22 (cone-shaped in this example), and another object 24 (in this example, a plane) are shown in FIG. 2. An intermittent marker or alignment icon 28 appears as a spiral between object 22 and plane 24 to indicate an alignment field between object 22 and plane 24. Further, in the preferred embodiment of the present invention, the object 22 casts a shadow 26 which in this example falls onto plane 24.

THE OBJECT MANIPULATION CURSOR

In the preferred embodiment of the present invention, the object manipulation cursor 20, controlled by a three-dimensional graphical object controller input device (1626 in FIG. 1) such as a 3D mouse or trackball, comprises a small cone that can be moved in three dimensions. In addition to moving the cursor latitudinally and longitudinally within the plane of the display screen, the 3D mouse 1626 also enables a user to move the cursor 20 into and out of the screen perpendicular to the plane of the display screen, toward and away from the user viewing the display screen.

In a preferred embodiment, moving the cursor 20 inside of a displayed object 22 causes the displayed object to become translucent, so that the cursor remains visible while it is inside of the translucent object. The translucent object 22 thus remains visible as the visible cursor 20 moves around inside of it. In a preferred embodiment, when a manipulated translucent object 22 is moved inside of another object, the manipulated translucent object 22 becomes opaque and the other object becomes translucent so that the manipulated object 22 remains visible inside of the other, now translucent, object.

The cursor 20 enables the operator to manipulate the position and orientation of a selected object. In the preferred embodiment of the present invention, pressing the mouse button and keeping it depressed when the cursor 20 is near the center of the displayed object 22 enables the user to positionally translate the object in accordance with the cursor 20. That is, the object 22 does not rotate as it is moved across the display screen. Furthermore, in the preferred embodiment, the cursor 20 changes shape when in the center of the object 22 to indicate that the cursor 20 has entered the center region of the object 22 where the object 22 can be translated without being rotated.

In the preferred embodiment of the present invention, selecting the object 22 by depressing the mouse button and holding it down while the cursor 20 is near the edge of the displayed object 22 and then manipulating the displayed object 22 causes the displayed object 22 to trail along behind the cursor 20, a technique referred to as "tail dragging."

Tail-dragging, as is known in the art and as described in U.S. Pat. No. 5,146,212 entitled "Manipulatable Orientation For A Translatable Graphic Object," takes a stream of 3D positions as input and produces a stream of yaw and pitch orientations as output. When combined with the original 3D stream, this gives control of five different (though not independent) degrees of freedom. Tail-dragging is loosely based on a physical model. Consider dragging a rock behind oneself by a rope. The rock stays a constant distance behind one, at an angle that changes depending on one's path. Tail-dragging calls the free end of the rope the "head" and the rock the "tail." For each new head position, a new tail position is computed by stretching the rope from the old tail, then restoring the rope to its original length. More precisely, to find the tail position at time step t, $$tail_t = head_t + \frac{tail_{t-1} - head_t}{tail_{t-1} - head_t} \; tail_0 - head_0.$$

The new $tail_t head_t$ vector can be compared to the original $tail_o head_o$ vector to find the yaw and pitch angles to rotate between the two states. The remaining degree of freedom (rotation about the new vector, or roll) can be constrained by computing an angle to minimize its change between steps. A user can translate and rotate an object simultaneously, using tail-dragging, by clicking the mouse button while touching the object with the cone cursor. The point selected on the object is considered the initial head position, and the initial tail position is computed as the point opposite the object center from the initial head position. As the user drags the object by the head position, the trailing tail position thus causes the object's orientation to change.

The tail dragging mode of manipulation thus allows an object 22 to rotate freely about the location point of the cursor as the cursor is moved about. Thus, the tail dragging manipulation mode alters both the position and orientation of the displayed object 22.

In the preferred embodiment of the present invention, dragging a manipulated object close to another object within a display scene, so that the manipulated object is within the influence of the other object's magnetic alignment field gradient, causes the manipulated object to become automatically attracted to and drawn into alignment with the other object under the influence of the alignment field gradient exerted by the other object.

As shown in FIG. 2, when a user moves the cursor 20 inside of an object 22, axes or cross hairs 27 appear that extend from the tip of the cursor 20 out in six directions to the boundaries of the object 22. Thus, a 3D set of axes or cross hairs 27 are provided which intersects the cone-shaped tip position or location point of the cursor 20 within an object 22. The axes 27 provide visual feedback to the user to further facilitate location of the cursor 20 inside of an object 22. Further, in the preferred embodiment of the present invention, when the user selects an object 22 for manipulation, the tip of the cursor 20 and the axes 27 become positionally fixed within the object 22 as long as the object 22 stays outside of another object's alignment field gradient.

Figure 3:
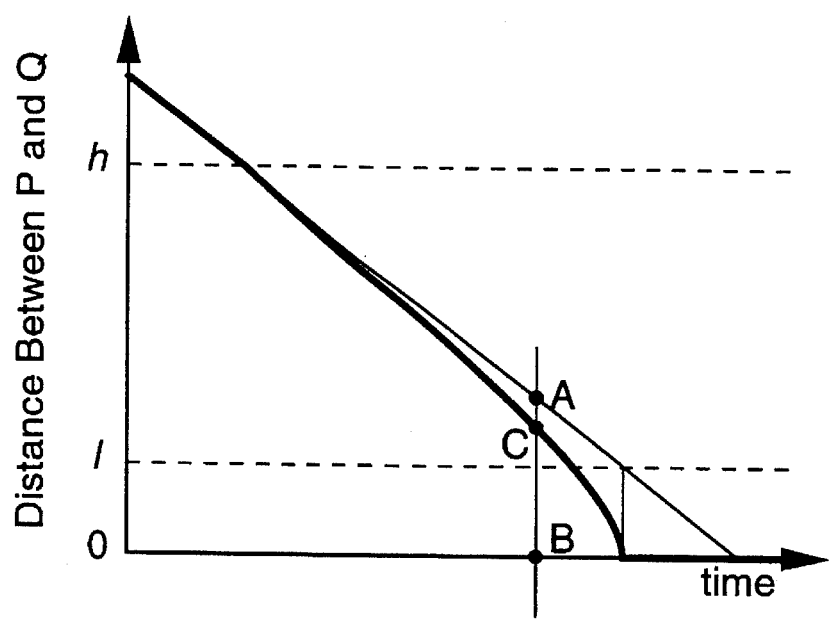
FIG. 3 is a graph illustrating a preferred embodiment in which, as a point of one object is moved within the influence of an alignment gradient field, the point smoothly pulls away from the cursor and into alignment with another object.

The object 22 follows the tip of the cursor 20 during manipulation until the manipulated object 22 comes within an alignment field gradient designated by a distance h, as shown in FIG. 3, of another object thus bringing the manipulated object 22 within the influence of the alignment field gradient of the other object. Still further, in the preferred embodiment of the present invention and referring again to FIG. 2, when a manipulated object 22 comes under the influence of an alignment field of another object, the object 22 starts to pull away from the cursor dictated position. An indicator 38 is displayed between the tip of the cursor 20 and the cross hairs 27 displayed within the object 22 to provide visual feedback to the user of the effect of the alignment field gradient.

FEEDBACK TO THE USER

In a preferred embodiment, the method and apparatus of the present invention conveys an alignment field gradient influence to the user in three ways. First, the manipulated object 22 and axes cross hairs 27 visually pull away from the displayed cursor 20, as indicated by visual marker 38, and into alignment with the other object 24. Second, a small spring-like marker or alignment icon 28 appears between the manipulated object 22 and the alignment object 24 thus indicating where the alignment field gradient influence is occurring. Third, the present invention generates sound effects that correspond to the gradual alignment and contact between the two objects. The sound effects are generated when the manipulated object 22 is dragged within the magnetic region of influence of the alignment object 24. As the objects come closer together, the sound effect becomes louder as the alignment influence becomes stronger. These three feedback mechanisms work in conjunction to provide an intuitive feel to the automatic alignment gradient field method and apparatus of the present invention. The intuitive feel is experienced by the user, which makes use of the alignment field gradient of the present invention easy to comprehend and utilize.

Informal user testing indicates that users take advantage of the automatic alignment field gradient of the present invention with ease. By exploration alone, users typically discovered the existence of the alignment influence and utilized the capability without the benefit of previous instruction. Users often spontaneously described the paradigm as "magnetic attraction." Further, users were easily taught the potentialities for alignment between the various features or combinations of the faces, edges, and vertices of the display objects.

ALIGNING TWO VERTICES

In a preferred embodiment, when the user drags a vertex of a displayed object towards the vertex of another object displayed in a scene, based on the model of magnetic attraction, the attraction between the two objects becomes stronger as the objects move closer together. FIG. 3 illustrates the effect in a preferred embodiment. The vertex that is being dragged is designated P, and the attractive vertex that is attracting P in the scene is designated as Q. The cursor specifies a position, A, for the dragged vertex. If P were pulled into complete alignment with Q, its position would be B. The vertex P is displayed at C, a position that is influenced by both the cursor position and P's attraction to Q.

Normally, when a manipulated object is outside of the influence of another object, point C is then co-located with point A, and the vertex follows the cursor exactly. As the user drags the manipulated object's vertex within a certain distance, h, from the other object's vertex, point C begins to pull away from point A and toward point B. As the user continues to move the manipulated object toward the other object (thus moving point A toward point B), point C pulls further away from point A and moves closer to point B. When point A moves within a certain distance, I, of point B, point C is automatically drawn by the present invention into alignment with point B.

It is important to note that with the apparatus and method of the present invention, the path of point C is smooth and continuous. In the present invention, point C does not "jump" into alignment with point B. Thus, the manipulated vertex can be placed arbitrarily close (as long as point A is not within distance I of point B, as was explained above) to the stationary vertex in the scene thus providing the user with enhanced expressiveness.

Position C lies somewhere between position A and position B. In a preferred embodiment, position C can be determined by a weighted average, based on a weighting function, as described in equation 1, $$C = (1-w(d))A + w(d)B \tag{1}$$

where w represents the strength of the alignment field gradient at a distance, d, from the object from which the alignment field emanates.

Figure 4:
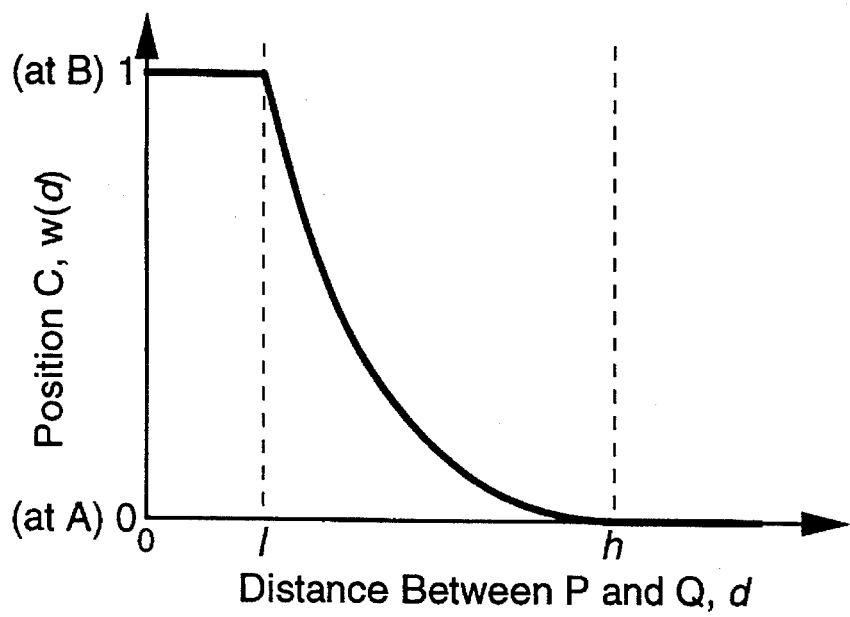
FIG. 4 is a graph illustrating how in a preferred embodiment the behavior of FIG. 3 is implemented by a weighted average of a function that depends on the distance between a manipulated object P and an alignment object Q.

The curve illustrated in FIG. 3 can be translated to the weighting function shown in FIG. 4. In a preferred embodiment this function is modeled by equation 2, $$w(d) = \begin{cases} d \leq l & 1 \\ l < d < h & \left(\frac{h-d}{h-l}\right)^3, \\ d \geq h & 0 \end{cases} \tag{2}$$

where d represents the distance between points A and B. In a preferred embodiment, the cubic exponent is chosen to emulate the natural field strength of magnetic attraction. Preferably, the distance h is chosen so that the attraction is easy to invoke yet small enough to eliminate spurious attractions. In a preferred embodiment, h is approximately one fifteenth of the width of the field of view in the plane of interest. The value of I is preferably chosen so that complete alignment is easy to attain by direct manipulation via the mouse, or some other manipulation device provided by the interface, yet is still small enough so that close placement of objects is possible without triggering automatic alignment. In a preferred embodiment, a value for l equal to approximately one quarter of h is utilized.

ROTATIONAL ALIGNMENT IN TWO DIMENSIONS

In the preferred embodiment, the alignment field gradient of the present invention specifies rotation as well. Just as the face of the magnet can easily be made coincident with the plane of a refrigerator door and then rotated on that plane, a face of a manipulated object can be easily made coincident with the plane of another object and rotated on the plane of the other alignment object.

Figure 5:
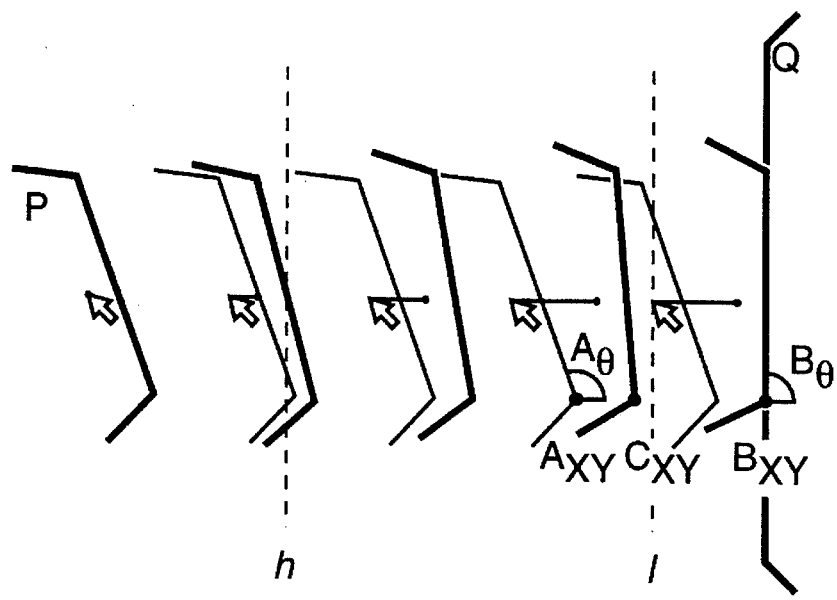
FIG. 5 is an illustration of a preferred embodiment in which, as an edge of a polygon of a manipulated object is dragged toward another object, the edge of the polygon of the manipulated object is pulled away from the cursor and into alignment with the other object in both position and orientation.

An example of rotational alignment follows. FIG. 5 illustrates how as an edge 100 of a polygon 22 is dragged towards an edge 110 of another polygon 24, it is pulled from the cursor 120 and toward alignment in both position and orientation. As shown in FIG. 5, the user drags the edge 100 of object 22 from left to right towards object 24. As the edge 100 moves closer to the edge 110 in the scene, the edge 100 begins to pull away from the cursor 120 position while simultaneously rotating into alignment with the edge 110. Thus, in the present invention, as the two objects 22 and 24 come close together edges 100 and 110 are automatically and precisely aligned in a parallel fashion.

As illustrated in FIG. 5, the position specified for edge 100 by the cursor point 120 is a point designated $A_{XY}$ and the orientation of edge 100 specified by the cursor point 120 is an angle, $A_\theta$. The position of $A_{XY}$, when object 22 is placed in alignment with object 24 is designated $B_{XY}$ and the orientation of edge 100 is an angle $B_\theta$. The object 23 (the manipulated object 22) under the influence of the alignment field gradient of object 24 is displayed somewhere between object 22 and object 24, at position $C_{XY}$ with orientation $C_\theta$, which in a preferred embodiment is determined by interpolation utilizing equation 3, $$C_{XY}=(1-w(d)A_{XY}+B_{XY}$$

$$C_\theta = A_\theta + (B_\theta - A_\theta + 180 + 360) MOD\ 360 - 180$$

where d represents the shortest distance between the edges of the objects 22 and 24.

ROTATIONAL ALIGNMENT IN THREE DIMENSIONS

Aligning polygonal objects in two dimensions is either a matter of position and orientation (for edge-edge feature alignment) or position only (for vertex-vertex, vertex-edge or edge-vertex feature alignment). In a preferred embodiment, any vertex, edge and/or face feature of a manipulated object may interact, under the influence of the alignment field gradient, with a vertex, edge, or face feature of another object in a scene from which the alignment field emanates.

In three dimensions, the cursor specifies a position and orientation for a feature P of an object. The goal is to align a feature P of one object with a feature Q of another object thus aligning the two objects. Preferably, the point, $A_{XY}$, of the feature of one object that is closest to the point, $B_{XY}$, of the feature of another object is aligned.

Figures 7A, 7B, 7C:
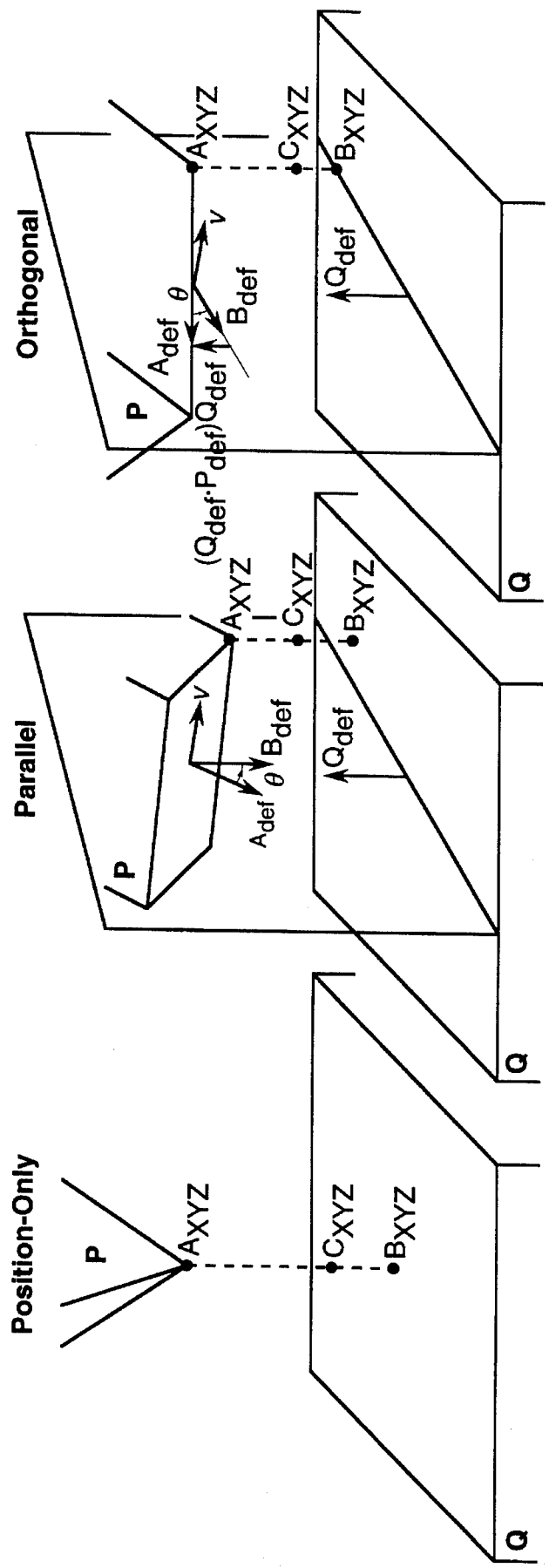
FIGS. 7A, 7B, and 7C are illustrations of a preferred embodiment showing how rotational alignment for 3D objects falls into three categories: Position-only alignment leaves the orientation of the manipulated object P unchanged. Paralleled alignment rotates the manipulated object P so that its defining vector is parallel to the alignment object Q. Orthogonal alignment rotates the manipulated object P so that its defining vector is perpendicular to the alignment object Q.

Referring now to FIGS. 7A, 7B, and 7C, although the cursor specifies a full three degrees of rotational freedom for an object, it is useful to refer to a "defining vector," designated as $A_{def}$, for each feature of the object. A vertex, however, has no defining vertex, see FIG. 7A. The defining vector for a face is the unit vector normal to the face, see FIG. 7B. The defining vector for an edge is the unit vector parallel to the edge, see FIG. 7C. The defining vector for the feature as specified by the cursor is designated $A_{def}$. The feature of one object that a feature of another object is being aligned with may also have a defining vector, $O_{def}$, see FIGS. 7B and 7C. Defining vectors are utilized in the preferred embodiment, instead of a more complete representation of three-dimensional rotation to save processing time and memory utilization because defining vectors are easier to manipulate mathematically in determining and interpolating orientation.

Figure 6:
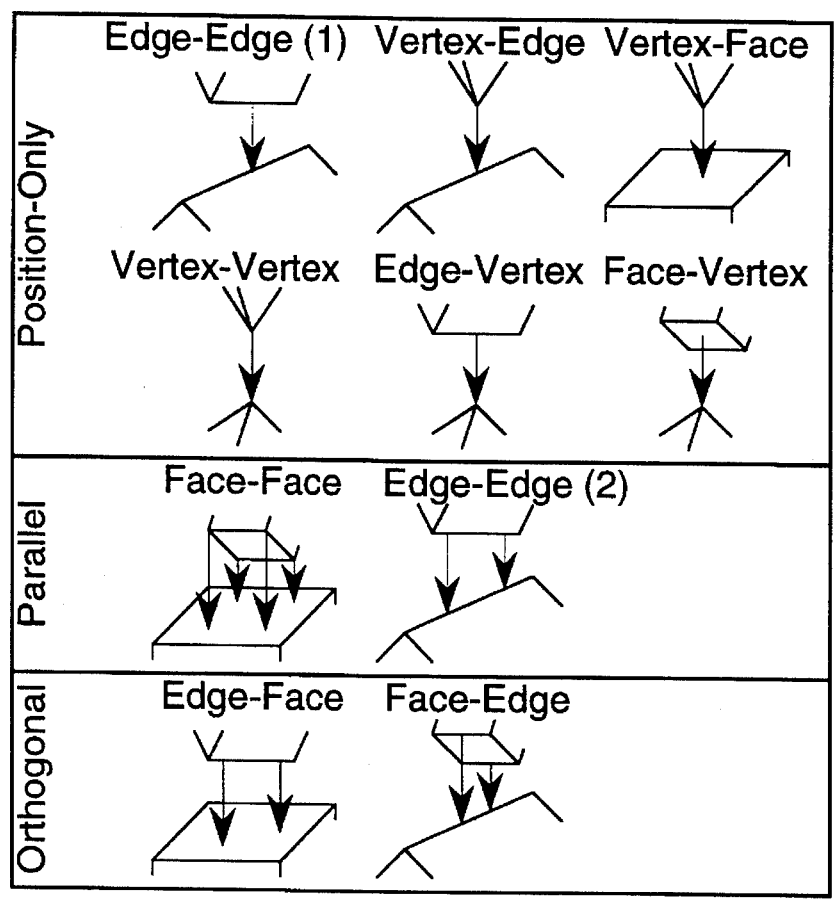
FIG. 6 is an illustration of the preferred embodiment showing how the ten possible alignments for 3D objects fall into three groups.

Referring now to FIG. 6, the ten attractions between feature types for 3D polyhedral objects can be seen. Notice that there are two cases for the edge-edge feature alignment: either the edges are made to intersect at a point or they are made coincident. These ten cases can be combined into three general categories, as shown in the figure and as discussed below. Note that each category generates rotations differently, as was illustrated in FIGS. 7A, 7B, and 7C and as will be explained below with reference to FIG. 6.

Position-Only Alignment: position-only alignments (as illustrated in FIG. 6, marked "Position-Only") do not change the orientation of the object, and do not deal with defining vectors. The object is displayed at a new position interpolated between the position as defined by the cursor and the position as defined by the alignment field gradient. In a preferred embodiment, the interpolation is determined according to equation 4:

$$C_{XYZ}=(1-w(d)A_{XYZ}+w(d)B_{XYZ} \qquad (4)$$

where d represents the distance between points $A_{XYZ}$ and $B_{XYZ}$, as was illustrated in FIG. 5. The manipulated object is translated so that $A_{XYZ}$ matches $C_{XYZ}$. The orientation of the manipulated object is as specified by the direct manipulation cursor.

Parallel Alignment: parallel alignments (as illustrated in FIG. 6, marked "Parallel[") align two features in orientation by rotating the defining vector of the feature of the manipulated object so that it becomes parallel to the defining vector of a feature of an alignment object. The defining vector that rotates the features into alignment, $B_{def}$, is one of the two unit vectors that are parallel to $Q_{def}$. The unit vector that minimizes rotation is chosen, i.e., the one that is closer in direction to $A_{def}$. In a preferred embodiment, this function is implemented as follows in equation 5, $$B_{def} = \begin{cases} Q_{def} \cdot A_{def} \geq 0 & Q_{def} \\ Q_{def} \cdot A_{def} < 0 & -Q_{def} \end{cases} \qquad (5)$$

The manipulated object is rotated so that its resulting defining vector approaches $B_{def}$. Rotation is in the plane spanned by $A_{def}$ and $B_{def}$, about an axis, v, that is perpendicular to both defining vectors. In a preferred embodiment, v is calculated utilizing equation 6.

$$v = normalize\ (B_{def} \times A_{def}) \qquad (6)$$

In a preferred embodiment, the amount of rotation, θ, is determined by finding the angles between the defining vectors and then scaling by the weighting function, as shown in equation 7.

$$\theta = w(d)\cos^{-1}(B_{def} \times A_{def}) \qquad (7)$$

A rotation matrix, M, is derived from v and θ as follows:

$$M = \begin{bmatrix} (1-\cos\theta)v_X^2 + \cos\theta & (1-\cos\theta)v_X v_Y + v_Z\sin\theta & (1-\cos\theta)v_X v_Z - v_Y\sin\theta \\ (1-\cos\theta)v_X v_Y - v_Z\sin\theta & (1-\cos\theta)v_Y^2 + \cos\theta & (1-\cos\theta)v_Y v_Z + v_X\sin\theta \\ (1-\cos\theta)v_X v_Z + v_Y\sin\theta & (1-\cos\theta)v_Y v_Z - v_X\sin\theta & (1-\cos\theta)v_Z^2 + \cos\theta \end{bmatrix}$$

The desired position, $C_{XYZ}$, is computed as in the Position-Only case as discussed above with reference to equation (4). The transformation for the manipulated object is computed by composing transformations to translate $A_{XYZ}$ to the origin, to rotate about v by the angle θ, and to translate the origin to $C_{XYZ}$.

Orthogonal Alignment: orthogonal alignments (as illustrated in FIG. 6, marked "Orthogonal") operate to align two features in orientation by making the defining vector of the feature of the manipulated object orthogonal to the defining vector of the feature of the alignment object. The defining vector that rotates the features into alignment, $B_{def}$, is perpendicular to a defining vector of a feature of the alignment object's defining vector, in the plane spanned by $A_{def}$ and $Q_{def}$. Again, there are two solutions and the one that minimizes rotation is used in the preferred embodiment. In a preferred embodiment, the minimal rotation is determined by equation 8, by removing from $A_{def}$ its orthogonal projection onto $Q_{def}$.

$$B_{def} = \text{normalize}(A_{def} - (A_{def} \cdot A_{def})Q_{def}). \qquad (8)$$

The final translation and rotation of the manipulated object is determined as in the Parallel case, as was discussed above.

ALIGNING OBJECTS

Figure 8:
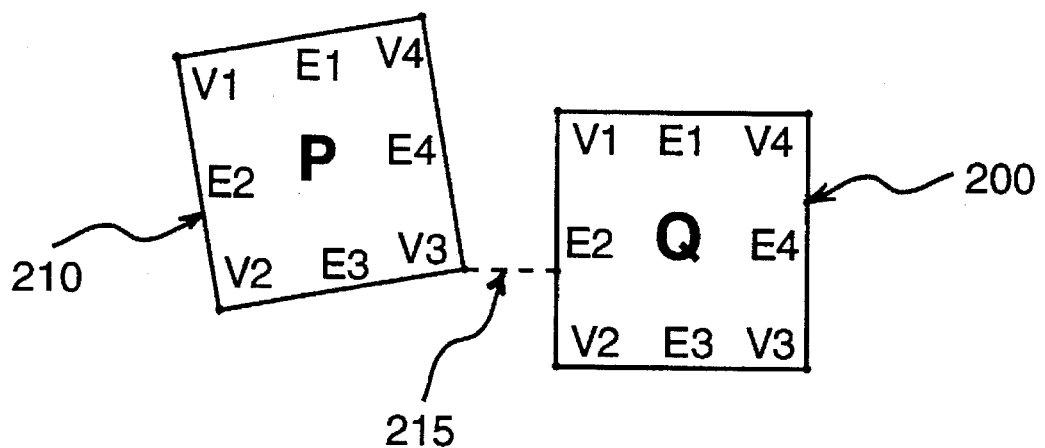
FIG. 8 is an illustration showing how in a preferred embodiment, when two objects are aligned, the pair of features that are already in the best or closest alignment determine how the two objects will be placed into precise alignment.

The discussion above explained alignment of one feature to another feature. Further, the preferred embodiment method and apparatus of the present invention automatically aligns complex objects comprised of those features. Consider the case of manipulating a square towards another square in two dimensions, as shown in FIG. 8. The most natural alignment for the two objects, P 210 and Q 200, is to conjoin $P_{E4}$ and $Q_{E2}$.

Each square, P and Q, is composed of eight features comprising four vertices ($P_{V1}$, $P_{V2}$, $P_{V3}$ and $P_{V4}$) and four edges ($P_{E1}$, $P_{E2}$, $P_{E3}$ and $P_{E4}$). An alignment can be produced for every combination of the features of P with the features of Q. Of the 64 possible solutions in this example, in a preferred embodiment, a very natural heuristic is provided to choose the feature of P which is nearest to a feature of Q. Relying on the closest distance between the features reduces the 64 possible combinations to three: $P_{E3}$–$Q_{E2}$, $P_{V3}$–$Q_{E2}$, and $P_{E4}$–$Q_{E2}$.

Another measure of distance between objects is the angular disparity between two features of different objects. In a preferred embodiment, a pair of features with great angular disparity can be ignored. In a preferred embodiment, only features within 20° of alignment of each other will be considered. This notion of angular disparity makes $P_{E4}$–$Q_{E2}$ a better choice than $P_{E3}$–$Q_{E2}$, but does not indicate useful information about $P_{V3}$–$Q_{E2}$ because the angular disparity between a vertex and an edge is undefined.

In the preferred embodiment of the present invention, based on the model of magnetic attraction, faces have a stronger alignment field gradient attraction than edges, which have a stronger attraction than vertices. Thus, in a preferred embodiment, an alignment field gradient influence is provided that fulfills the intuitive expectations of the user in this example, as is explained more fully below.

In a preferred embodiment, the present invention discards any potential alignment with an object whose distance, d, is greater than the limit for attraction distance, h, or whose angular disparity is greater than the desired limit. In a preferred embodiment, when comparing two potential 2D alignment features, three general heuristics are utilized to select the best pair of alignment features: (1) Choose the feature pair with the smallest distance, d; (2) When the d's are equal for two candidate alignment features, choose an edge-edge alignment before anything else; and (3) When the d's are equal for two candidate alignment features and both alignment features are edge-edge, choose the one with the greater dot product $|A_{def} \cdot B_{def}|$. Referring again to FIG. 8, in a preferred embodiment, applying these heuristics, the desired alignment, $P_{E4}$–$Q_{E2}$, is selected from the 64 possible combinations of features in FIG. 8.

In a preferred embodiment, in three dimensions, two alignment feature pair candidates are compared to select the best pair of alignment features utilizing the following heuristics: (1) Choose the alignment feature pair with the smallest distance, d; (2) When the d's are equal, choose the feature pair with the "stronger" alignment influence: Parallel before Orthogonal; and Orthogonal before Position-Only; (3a) When d's are equal and both are Parallel, choose the alignment object with the greater dot product $|A_{def} \cdot B_{def}|$; and (3b) When the d's are equal and both are Orthogonal, choose the alignment feature pair with the lesser dot product $|A_{def} \cdot B_{def}|$.

The following two sections discuss generating those combinations of features and determining the shortest distance between them, in the 2D and the 3D cases.

CLOSEST FEATURES IN TWO DIMENSIONS

Many features may qualify as the nearest feature pair between two objects. In FIG. 8, there are three pairs of features at the same distance (because the closest points between $P_{E3}$–$Q_{E2}$, $PV_{V3}$–$Q_{E2}$, and $P_{E4}$–$Q_{E2}$ are all at the same distance, d, as indicated by the dotted line 215), however, only the most restrictive of these features, $P_{V3}$–$Q_{E2}$, is chosen. The other feature pairs are then determined by a process referred to herein as "feature expansion," as discussed more fully below.

When comparing feature pairs, a pair of features will be an accepted solution only if it is the most restrictive feature pair at that distance. To determine the closest features of a pair of objects, the distances between all combinations of features are determined. For polygonal objects in two dimensions, the closest features might be two vertices, a vertex and an edge, or two intersecting edges. Each combination of feature types is compared by a different method, as follows:

Vertex-Vertex Feature Comparison: The distance between a pair of vertices is determined by Pythagorean distance, a method well known in the art. Vertex-Edge Feature Comparison: A vertex is compared to an edge by projecting the vertex onto a line through the edge. If the vertex is at p and the endpoints of the edge are $q_0$ and $q_1$, then the projection, r, is determined by equation 9.

$$t = \frac{(p - q_0) \cdot (q_1 - q_0)}{(q_1 - q_0) \cdot (q_1 - q_0)}, \qquad (9)$$

$$r = q_0 + t(q_1 - q_0).$$

If the projection point lies within the edge, i.e., $0<t<1$, then the vertex projects onto the edge, and the distance between p and r is compared to see whether this pair of features is the closest. If $t \leq 0$ then the vertex at $q_0$ is the same distance from p, but is more restrictive; if $t \geq 1$, then the vertex at $q_1$ is more restrictive; in either case, the pair is rejected.

Edge-Edge Feature Comparison: to detect if two edges intersect, the point of intersection of two lines through the edges is determined. If the endpoints of the edges are $p_0$ and $p_1$, and $q_0$ and $q_1$, the point of intersection, r, is computed by equation 10.

$$v_1 = (p_{0Y} - p_{1Y}, p_{0X} - p_{1X}), \qquad (10)$$
$$v_2 = (q_{0Y} - q_{1Y}, q_{0X} - q_{1X}),$$

$$t_1 = -\frac{v_2 \cdot q_0 + v_2 \cdot p_0}{v_2 \cdot (p_1 - p_0)},$$

$$t_2 = -\frac{v_1 \cdot p_0 + v_1 \cdot q_0}{v_1 \cdot (q_1 - q_0)},$$

$$r = p_0 + t_1(p_1 - p_0).$$

If the intersection point lies within the two edges, i.e., $0<t_1<1$ and $0<t_2<1$, then the two edges intersect, with $d=0$.

In a preferred embodiment, for two objects, P and Q, each combination of features is compared: P's vertices to Q's vertices, P's vertices to Q's edges, Q's vertices to P's edges, and P's edges to Q's edges.

CLOSEST FEATURES IN THREE DIMENSIONS

For polygonal objects in three dimensions, finding the closest feature pairs includes dealing with polygonal faces. In a preferred embodiment, to find the closest points between a pair of features on two objects, the feature pairs are iterated over, comparing the vertices, edges and faces of one object to the vertices, edges and faces of another object. However, in a preferred embodiment, the closest features are never both faces—an edge or vertex will always be closer.

For each pair of features, the points on the two features that are closest to one another are determined. To facilitate this determination, edges are transformed into lines and faces into planes. The closest points between the two transformed or generalized features is then determined. If the points fall outside of the restrictions on the features, for example the endpoints of an edge or the bounding edges of a polygonal face, then the pair is discarded. Otherwise, the distance between the points is determined. The pair of points with the smallest distance is remembered, along with the feature types (vertex, edge, face) on which the points lie.

In a preferred embodiment, each combination of feature types (excluding face-face) is compared by a different method, as follows:

Vertex-Vertex Feature Comparison: When a vertex is compared to another vertex, the closest points are the vertices themselves.

Vertex-Edge Feature Comparison: A vertex is compared to an edge by projecting the vertex onto a line coincident with and extending through the edge. In a preferred embodiment, if the vertex is at a point p, and the edge's endpoints are $q_0$ and $q_1$, then the projection of the vertex on the edge is r, as determined by equation 11.

$$t = \frac{p \cdot (q_1 - q_0) - q_0 \cdot (q_1 - q_0)}{(q_1 - q_0) \cdot (q_1 - q_0)}, \qquad (11)$$

$$r = q_0 + t(q_1 - q_0).$$

If r lies strictly within the edge, $0<t<1$, then the vertex projects onto the edge, and p and r are potentially the closest features, otherwise the vertex-edge pair of features is rejected.

Vertex-Face Feature Comparison: A vertex is compared to a face by projecting the vertex onto the plane that contains the face's polygon. If the vertex is at p, the face passes through q with normal n, the point of projection is r, as determined by equation 12.

$$r = p - ((q-p) \cdot n)n \qquad (12)$$

In a preferred embodiment, the face must contain r if the vertex-face pair is to be considered as the closest feature pair. The point of projection is compared to each edge to determine if it is "inside" or "outside" of the line that the edge determines. In a preferred embodiment, with the edge's endpoints denoted $e_0$ and $e_1$, the point lies outside the polygon when the result of equation 13 is greater than zero.

$$(r - e_0) \cdot ((e_1 - e_0) \times n) \qquad (13)$$

Note that equation 13 works for convex polygons whose edges are listed in counter-clockwise order. If r is within the polygon then p and r are potentially the closest features.

Edge-Face Feature Comparison: An edge is compared to a face in much the same way as a vertex to a face. Instead of working with the projected point, however, the intersection of the edge line with the face polygon plane is used for alignment determination purposes. In a preferred embodiment, if the edge has endpoints denoted $p_0$ and $p_1$, the face passes through q with normal n, the intersection is r, as calculated by equation 14.

$$t = \frac{n \cdot (p_0 - q)}{n \cdot (p_1 - p_0)}, \qquad (14)$$

$$r = p_0 + t(p_1 - p_0)$$

If the edge is parallel to the face then the denominator used to compute t is zero, and the pair is discarded. The pair is considered only if r is within the edge segment, $0<t<1$. The two points resulting from a successful comparison of a face with an edge are coincident.

Edge-Edge Comparison: The closest points between two edges is determined by finding the closest possible approach between the lines through the two edges. In a preferred embodiment, if the edges have endpoints $p_0$ and $p_1$, and $q_0$ and $q_1$, the closest points, $r_1$ and $r_2$, are determined by equation 15.

$$v = (p_1 - p_0) \times (q_1 - q_0) \qquad (15)$$

-continued $$t_1 = \frac{|q_0 - p_0\, q_1 - q_0\, v}{v \cdot v},$$

$$t_2 = \frac{|q_0 - p_0\, p_1 - p_0\, v}{v \cdot v},$$

$$r_1 = p_0 + t_1\,(p_1 - p_0),$$
$$r_2 = q_0 + t_2\,(q_1 - q_0)$$

If the edges are parallel, then the denominator used to find $t_1$ and $t_2$ is zero, and the pair of features can be discarded. If the points are within the edge segments, i.e., $0<t_1<1$ and $0<t_1<1$, then the points $r_1$ and $r_2$ are the closest between the edges.

Since only distances which are less than a constant, h, are of interest, computational speed is increased by rejecting any pair of objects or features whose bounding boxes (the smallest axis-aligned box that contains all the points of all the features of the object, as is well known in the art) are greater than h apart. If the objects are of great quantity or complexity, a spatial sorting technique could be used to reduce the number of comparisons.

For each pair of features compared in this way, the distance between the closest points is determined. The comparison that results in the smallest distance between the features is selected as optimal. When the process is complete, this results in the closest points between objects P and Q, and the principal features that contain the points.

FEATURE EXPANSION

Once the closest points between the manipulated object and the alignment object in the scene are determined, an alignment between the two objects can be determined as follows. The closest points on each are expanded into a list of all features adjacent to the two points. Thus, two lists are generated: one for all features coincident with the closest point on the manipulated object and one for all features coincident with the closest point on the alignment object.

Figure 9:
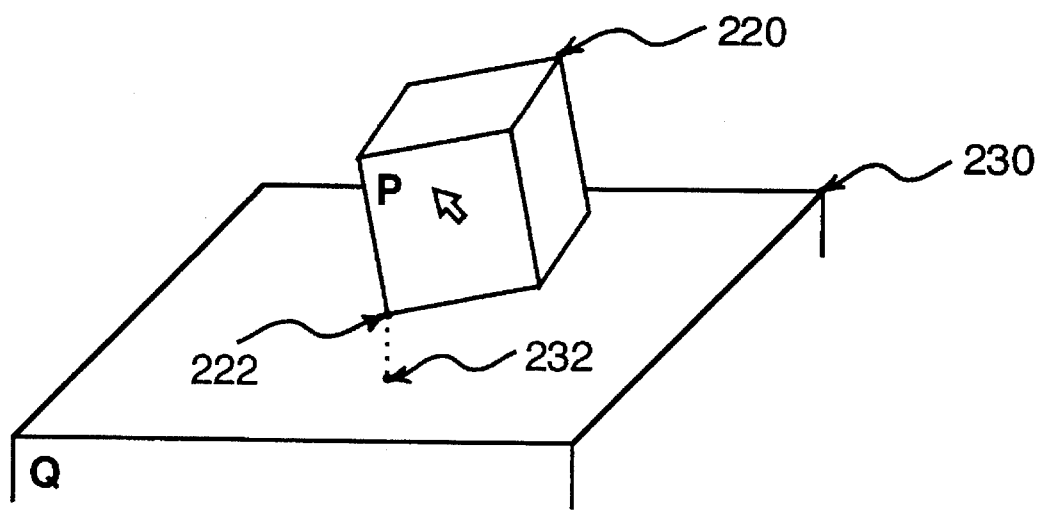
FIG. 9 is an illustration of how in a preferred embodiment, in order to determine how two objects should align, the closest point between the two objects is determined, then the features incident to the closest points are compared; and, FIG. 10 is an illustration showing how in a preferred embodiment, automatic alignment of an object is implemented for (a) alignment to multiple features; (b) special points; (c) curves and geometric objects; and (d) persistent alignment.

Referring again to FIG. 8, the closest point on P is $P_{V3}$ which is incident to a vertex ($P_{V3}$ itself) and two edges ($P_{E3}$ and $P_{E4}$) while the closest point on Q is $Q_{E2}$ which is incident only to an edge ($Q_{E2}$ itself). Referring now to FIG. 9, the closest point 222 on object P 220 is incident to a vertex, three edges and three faces while the closest point 232 on object Q 230 is incident only to a face. The set of all features adjacent to (coincident with) the closest set of points between the two objects is called an "expansion list."

The expansion list for each point is determined easily since the features that contain the point have already been located and stored for this use during the near point determination process as was discussed above. The three possibilities for a point are: i) a point on a face feature; ii) a point on an edge feature; and, iii) a point on a vertex feature. A point on a face feature is adjacent only the face. A point on an edge feature is adjacent the edge and the two faces that meet at the edge. A point on a vertex feature is adjacent the vertex, the edges that meet at the vertex, and the faces that meet at the edges.

All combinations of features in the two expansion lists (again, one list for each object) are potential candidates for alignment. Each combination is examined in turn, the appropriate alignment is computed, and the best of the alignments is determined by the comparison heuristics as explained above.

To review and further explain the preferred embodiment of the method and apparatus of the present invention, when the user selects an object and drags it within a display scene, the apparatus and method of the present invention adapts to find the best alignment of the object with any other objects in the scene. The cursor specifies a position and orientation for the object as it is dragged. The method and apparatus of the present invention modifies the dragged object's position and orientation so that a feature of the manipulated object is in better alignment with a feature of an object in the scene.

At each new position, the features of the dragged object are compared to the features of the objects in the scene. The present invention determines the closest points on the most restrictive features between the manipulated object and the other objects appearing in a scene. An expansion list containing the features incident to each of the closest points is generated. An alignment is generated for each combination of features from the two expansion lists. The best alignment is utilized to determine and display a new position and orientation for the manipulated object.

In general, there may be any number of features in the "best" alignment. Preferably, it does not matter which one is chosen, as long as the choice is repeatable (accomplished in the present invention by using the same sort order each time, as was explained above). If the choice changed between successive iterations, then user feedback could be confusing.

Note that no state information need be remembered between object manipulations. The alignment is completely specified by the object position and its associated geometries.

OBJECT REPRESENTATION

In the preferred embodiment, an object is represented as a mesh of polygonal faces that completely tile the object's surface. For example, a cube is described by its six faces, as well as the vertices at the corners and the edges that connect the vertices and faces. Holes are permitted, so objects may be topologically manifold.

In the preferred embodiment of the method and apparatus of the present invention, any feature (face, edge or vertex) can be accessed from any adjacent feature. This is accomplished by storing objects in a Winged Edge data structure, as is well known in the art. The Winged Edge data structure represents a polygonal mesh surface as a set of vertices, edges and polygonal faces. A vertex contains its coordinates in space, along with a reference to one of the edges that are adjacent to the vertex. A face contains a reference to one of the edges that bound the face. An edge contains references to the two vertices that are its endpoints, the two polygons that meet at the edge, and to four other edges. The four edge references indicate the next clockwise edge and counter-clockwise edge at each endpoint. The Winged Edge data structure thus allows fast access from an feature to all of the features that are adjacent to it. Note that portions of the method and apparatus of the present inversion are simplified by requiring all faces to be closed and convex.

The method and apparatus of the present invention may operate on a geometric description that is different from the representation used for displaying the object. For example, the "alignment geometry" might be broken down into greater or fewer polygons than utilized for the display geometry. Alternately, less than all features of the object may be represented by the alignment geometry, for example, the alignment geometry of a chair might specify just the plane of the chair's feet, and the shapes of the seat and back to facilitate aligning the chair.

Note that the integration of the present invention with a direct manipulation graphical user interface yields powerful functionality without interface clutter.

Figure 10:
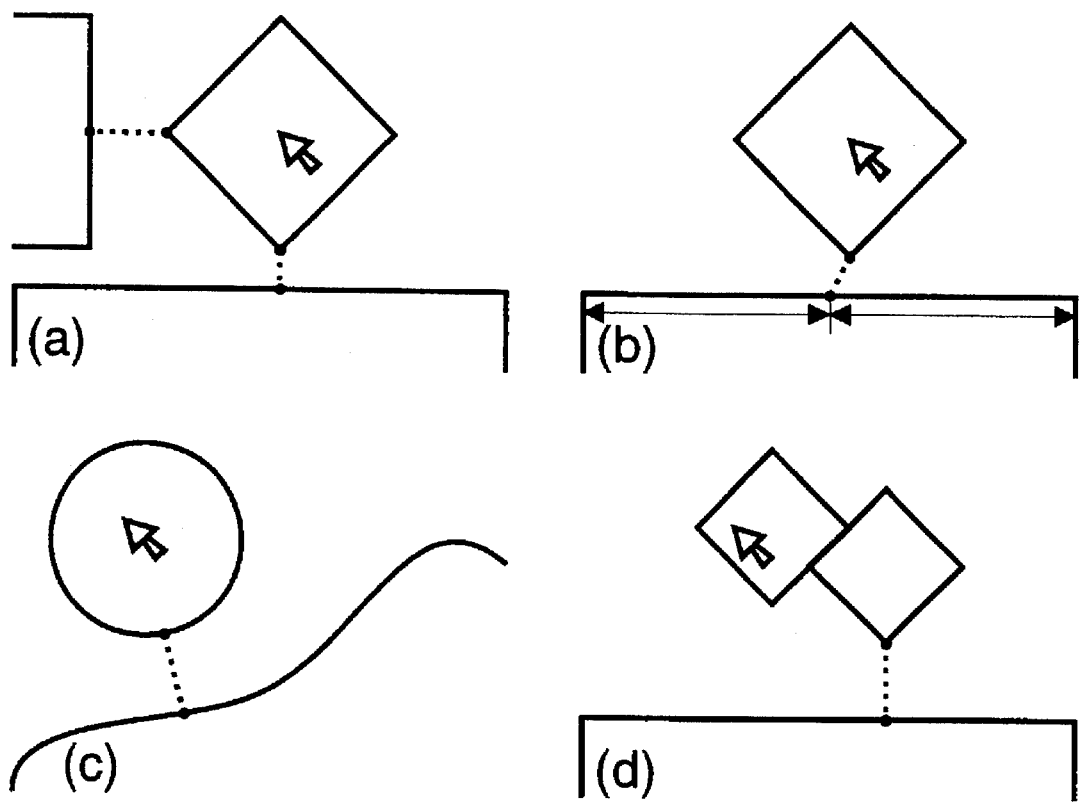

Referring now to FIG. 10, four alternative embodiments of the present invention will now be reviewed, In the magnet and refrigerator door scenario, for example, in an alternative embodiment and as indicated by example (a) of FIG. 10, the magnet object can be aligned with multiple other objects simultaneously. This feature would be very useful in a graphic editor.

Certain positions on an object's alignment geometry may be more significant than others. A user may want to position a lamp at the center of a table, for example. In another alternative embodiment, frequently used special points, like face and edge midpoints, as indicated in example (b) of FIG. 10 can be automatically included in the alignment geometry, and others might be added in the modeling process.

Note that in a still further alternative embodiment, other object representations are possible as indicated by example (c) of FIG. 10. For example, the present invention could be extended to utilize spline patches instead of flat polygons, thus facilitating more precise representations of curved surfaces. Solid or volumetric representations could likewise be accommodated.

In an even further alternative embodiment, once the user aligns two objects, the system of the present invention could maintain the alignment and moves the two objects as a single object or group as indicated by example (d) of FIG. 10. This capability would preferably include an interface selection such as, for example, keyboard commands or menu selections for creating and breaking such multiple object alignments.

Still further, and referring again to example (d) of FIG. 10, the user could also use a "shift-click" operation, as is well known in the art, to select more than one object at a time without having to align these separate objects, and then treat these multiple selected objects as an aggregate or single object for purposes of movement and alignment with another object or objects in the scene.

What follows is a pseudocode listing of the alignment methodology of the preferred embodiment of the present invention:

---

```
PSet ⇐ set of all features that are being aligned
QSet ⇐ set of all features that are being aligned to
d' ⇐ h
P' ⇐ { }
Q' ⇐ { }
for each feature P in PSet
    for each feature Q in QSet
        if P is a vertex
            p ⇐ world-space coordinates of P
        if P is an edge
            p₀ ⇐ world-space coordinates of one endpoint of P
            p₁ ⇐ world-space coordinates of the other endpoint of P
        if P is a face
            p ⇐ world-space coordinates of some point on P
            n ⇐ world-space vector normal to P if Q is a vertex
            q ⇐ world-space coordinates of Q
        if Q is an edge
            q₀ ⇐ world-space coordinates of one endpoint of Q
            q₁ ⇐ world-space coordinates of the other endpoint of Q
        if Q is a face
            q ⇐ world-space coordinates of some point on Q
            n ⇐ world-space vector normal to Q if P is a vertex and Q is a vertex
            a ⇐ p
            b ⇐ q
            go to ACCEPT if P is a vertex and Q is an edge
            t ⇐ (p·(q₁−q₀) − q·(q₁−q₀))/((q₁−q₀)·(q₁−q₀))
            if 0 < t < 1
                a ⇐ p
                b ⇐ q₀ + t(q₁−q₀)
                go to ACCEPT
            else
                go to REJECT if P is a vertex and Q is a face
            a ⇐ p
            b ⇐ p − ((q−p)·n)n
            r ⇐ b
            F ⇐ Q
            go to CLIP if P is an edge and Q is a vertex
            t ⇐ (q·(p₁−p₀) − p·(p₁−p₀))/((p₁−p₀)·(p₁−p₀))
```

```
                        if 0 < t < 1
                            a ⇐ p₀ + t (p₁−p₀)
                            b ⇐ q
                            go to ACCEPT
                        else
                            go to REJECT
            if P is an edge and Q is an edge
                    v ⇐ (p₁−p₀) × (q₁−q₀)
                    if v · v = 0 go to REJECT
                    t₁ ⇐ |q₀−p₀ q₁−q₀ v|/(v · v)
                    t₂ ⇐ |q₀−p₀ p₁−p₀ v|/(v · v)
                    if 0 < t₁ < 1 and 0 < t₂ < 1
                            a = p₀ + t₁ (p₁−p₀)
                            b = q₀ + t₂ (q₁−q₀)
                            go to ACCEPT
                    else
                            go to REJECT if P is an edge and Q is a face
                    t ⇐ (n · (p₀−q))/(n · (p₁−p₀))
                    if 0 < t < 1
                            a ⇐ p₀ + t (p₁−p₀)
                            b ⇐ a
                            r ⇐ a
                            F ⇐ Q
                            go to CLIP
                    else
                            go to REJECT if P is a face and Q is a vertex
                    a ⇐ q − ((p−q)·n)n
                    b ⇐ q
                    go to CLIP if P is a face and Q is an edge
                    t ⇐ (n · (q₀−p))/(n · (q₁−q₀))
                    if 0 < t < 1
                            a ⇐ p₀ + t (p₁−p₀)
                            b ⇐ a
                            r ⇐ a
                            F ⇐ P
                            go to CLIP
                    else
                            go to REJECT if P is a face and Q is a face
                    go to REJECT CLIP
                for each edge, e, of face F
                        e₀ ⇐ world-space coordinates of clockwise endpoint of edge e
                        e₁ ⇐ world-space coordinates of counter-clockwise endpoint of edge e
                        if (r−e₀) · ((e₁−e₀) × n) > 0 go to REJECT
                go to ACCEPT ACCEPT
                    d ⇐ √((aₓ−bₓ)² + (a_y−b_y)² + (a_z−b_z)²)
                    if d < d'
                            d' ⇐ d
                            a' ⇐ a
                            b' ⇐ b
                            P' ⇐ P
                            Q' ⇐ Q
                    end of loop - get next pair (P, Q)

REJECT
                end of loop - get next pair (P, Q)
g' ⇐ 0
for each feature P that is adjacent to P'
    for each feature Q that is adjacent to Q'
        if P is a face and Q is a face
                call to PARALLEL otherwise if P is an edge and Q is an edge
                call to PARALLEL
                call to POSITION-ONLY
```

```
             otherwise if P is an edge and Q is a face, or P is a face and Q is an edge
                    call to ORTHOGONAL otherwise
                    call to POSITION-ONLY
    if g' > 0
        move PSet by composing the transformations:
             translate a' to the origin
             if g' ≠ 1, rotate through w(d') θ' about v'
             translate the origin to (1-w(d'))a' + w(d')b'
FINISHED
procedure PARALLEL
        if $Q_{def} \cdot P_{def} \geq 0$
             $B_{def} \Leftarrow Q_{def}$
        else
             $B_{def} \Leftarrow Q_{def}$
        v ⇐ normalize ($B_{def} \times P_{def}$)
        θ ⇐ $\cos^{-1}$ ($B_{def} \cdot P_{def}$)

if θ > maxAngle return to caller g ⇐ 3
        s ⇐ $B_{def} \cdot P_{def}$
        go to COMPARE
procedure ORTHOGONAL
        $B_{def}$ ⇐ normalize ($P_{def} - (Q_{def} \cdot P_{def})Q_{def}$)

v ⇐ normalize ($B_{def} \times P_{def}$)
        θ ⇐ $\cos^{-1}$ ($B_{def} \cdot P_{def}$)

if θ > maxAngle return to caller g ⇐ 2
        s ⇐ $-(B_{def} \cdot P_{def})$
        go to COMPARE
procedure POSITION-ONLY
        g ⇐ 1
        s ⇐ 0
        go to COMPARE
COMPARE
        if g > g', or g = g' and s > s'
             v' ⇐ v
             θ' ⇐ θ
             g' ⇐ g
             s' ⇐ s
        return to caller
```

The description of the invention given above is intended to be interpreted broadly. Such modifications and variations of the embodiments of the present invention described above, that may be apparent to a person skilled in the art, are intended to be included within the scope of this invention.

What is claimed is:

1. A method for aligning a first object to a second object in a computer system comprising a processor, memory, display and graphic object controller, the method comprising:

a) displaying the first object and the second object on the computer display;

b) displaying a cursor on the computer display, said cursor coupled to the graphic object controller;

c) selecting with the cursor coupled to the graphic object controller the first object displayed on the computer display;

d) manipulating with the graphic object controller the first object displayed on the computer display towards the second object displayed on the computer display;

e) providing an alignment field gradient emanating from the second object; and f) aligning the first object to the second object in accordance with the alignment field gradient.

2. The method of claim 1 wherein the step of aligning starts when the first object is manipulated with the graphic object controller to within a first predetermined distance from the second object and finishes when the first object is manipulated with the graphic object controller to within a second predetermined distance from the second object wherein the second predetermined distance is smaller than the first predetermined distance.

3. The method of claim 2 wherein the step of aligning further comprises displacing the position of the first object from the position of the cursor coupled to the graphic object controller according to a strength of the alignment field gradient.

4. The method of claim 3 wherein the step of aligning the first object to the second object comprises aligning one feature of the first object to one feature of the second object wherein a feature can be any element of the set comprised of an object's vertices and edges in the case of a two-dimensional object and vertices, edges and faces in the case of a three-dimensional object.

5. The method of claim 4 wherein vertex features are aligned before edge features and edge features are aligned before face features.

6. The method of claim 5 further comprising displaying the cursor inside the first object when the first object is selected.

7. The method of claim 6 further comprising displaying an axis indicator when the cursor is inside of and near the center of the first object.

8. The method of claim 7 further comprising displaying a displacement indicator between the axis indicator and the cursor inside the first object during the step of aligning.

9. The method of claim 3 wherein a strength of the alignment field gradient is the cubic of the result of dividing the difference between the first predetermined distance and the current distance between the first object and the second object and the difference between the first predetermined distance and the second predetermined distance.

10. The method of claim 3 further comprising the step of generating a sound effect corresponding to a strength of the alignment field gradient exerted on the first object.

11. The method of claim 3 wherein the first object is comprised of one or more objects and the second object is comprised more than one object.

12. The method of claim 4 wherein the step of manipulating the first object causes translation and rotation of the first object when the cursor is near a boundary of the first object.

13. The method of claim 4 further comprising displaying a visual indicator of the alignment field gradient between the first object and the second object during the step of aligning.

14. The method of claim 6 wherein the step of manipulating the first object causes translation of the first object when the cursor is inside of and near the center of the first object.

15. The method of claim 6 further comprising displaying the first object as translucent.

16. An apparatus for aligning a first object to a second object in a computer system comprising a processor, memory, display and graphic object controller, the apparatus comprising:

a) means for displaying the first object and the second object on the computer display;

b) means for displaying a cursor on the computer display, said cursor coupled to the graphic object controller;

c) means for selecting with the cursor coupled to the graphic object controller the first object displayed on the computer display;

d) means for manipulating with the graphic object controller the first object displayed on the computer display towards the second object displayed on the computer display;

e) means for providing an alignment field gradient emanating from the second object; and f) means for aligning the first object to the second object in accordance with the alignment field gradient.

17. The apparatus of claim 16 wherein the means for aligning starts aligning the first object to the second object when the first object is manipulated with the graphic object controller to within a first predetermined distance from the second object and finishes aligning the first object to the second object when the first object is manipulated with the graphic object controller to within a second predetermined distance from the second object wherein the second predetermined distance is smaller than the first predetermined distance.

18. The apparatus of claim 17 wherein the means for aligning further comprises means for displacing the position of the first object from the position of the cursor coupled to the graphic object controller according to a strength of the alignment field gradient.

19. The apparatus of claim 18 wherein the means for aligning the first object to the second object comprises means for aligning one feature of the first object to one feature of the second object wherein a feature can be any element of the set comprised of an object's vertices and edges in the case of a two-dimensional object and vertices, edges and faces in the case of a three-dimensional object.

20. The apparatus of claim 19 wherein the means for aligning one feature of the first object to one feature of the second object aligns vertex features before edge features and aligns edge features before face features.

21. The apparatus of claim 20 further comprising means for displaying the cursor inside the first object when the first object is selected.

22. The method of claim 21 further comprising means for displaying an axis indicator when the cursor is inside of and near the center of the first object.

23. The apparatus of claim 22 further comprising means for displaying a displacement indicator between the axis indicator and the cursor inside the first object when the first object is being aligned to the second object.

24. The apparatus of claim 18 wherein a strength of the alignment field gradient is the cubic of the result of dividing the difference between the first predetermined distance and the current distance between the first object and the second object and the difference between the first predetermined distance and the second predetermined distance.

25. The apparatus of claim 18 further comprising means for generating a sound effect corresponding to a strength of the alignment field gradient exerted on the first object.

26. The apparatus of claim 18 wherein the first object is comprised of one or more objects and the second object is comprised of more than one object.

27. The apparatus of claim 19 wherein the means for manipulating the first object causes translation and rotation of the first object when the cursor is near a boundary of the first object.

28. The apparatus of claim 19 further comprising means for displaying a visual indicator of the alignment field gradient between the first object and the second object when the first object is being aligned to the second object.

29. The apparatus of claim 21 wherein the means for manipulating the first object causes translation of the first object when the cursor is inside of and near the center of the first object.

30. The apparatus of claim 21 further comprising means for displaying the first object as translucent.

31. A method for aligning a displayed representation of an object comprising the steps of:

(a) displaying a representation of a first object in an initial position on a display screen, the display screen under the control of a processor;

(b) displaying a representation of a second object on the display screen;

(c) moving the representation of the first object toward the second object in a visually continuous manner using a cursor whose position is controlled by a cursor movement mechanism;

(d) calculating a current position for the first object which is displaced from a cursor dictated position by an amount which is determined as if the first object was under the gradual influence of an alignment field emanating from the second object; and (e) displaying a representation of the first object on the display screen in the current position.

32. An apparatus for aligning a displayed representation of an object comprising:
   (a) means for displaying a representation of a first object in an initial position on a display screen, the display screen under the control of a processor;
   (b) means for displaying a representation of a second object on the display screen;
   (c) means for moving the representation of the first object toward the second object in a visually continuous manner using a cursor whose position is controlled by a cursor movement mechanism;
   (d) means for calculating a current position for the first object which is displaced form a cursor dictated position by an amount which is determined as if the first object was under the gradual influence of an alignment field emanating from the second object; and
   (e) means for displaying a representation of the first object on the display screen in the current position.

33. A method for aligning a first object to a second object in a computer system comprising a processor, memory, display and graphic object controller, the method comprising:
   a) displaying the first object and the second object on the display of the computer system;
   b) displaying a cursor on the display of the computer system wherein the cursor defines a cursor position on the display of the computer system, said cursor coupled to the graphic object controller;
   c) selecting with the cursor coupled to the graphic object controller the first object displayed on the display of the computer system;
   d) manipulating with the graphic object controller the selected first object displayed on the display of the computer system;
   e) providing an alignment field gradient emanating from the second object displayed on the display of the computer system; and,
   f) aligning the manipulated first object displayed on the display of the computer system with the second object displayed on the display of the computer system wherein when the manipulated first object is manipulated with the graphic object controller to within a first predetermined distance from the second object the displayed location of the manipulated first object on the display of the computer system is gradually shifted away from the cursor position and towards the displayed location of the second object on the display of the computer system and when the manipulated first object is manipulated with the graphic object controller to within a second predetermined distance from the second object the displayed location of the manipulated first object on the display of the computer system is gradually shifted away from the cursor position and into alignment with the displayed location of the second object on the display of the computer system.

34. An apparatus for aligning a first object to a second object in a computer system comprising a processor, memory, display and graphic object controller, the apparatus comprising:
   a) means for displaying the first object and the second object on the display of the computer system;
   b) means for displaying a cursor on the display of the computer system wherein the cursor defines a cursor position on the display of the computer system, said cursor coupled to the graphic object controller;
   c) means for selecting with the cursor coupled to the graphic object controller the first object displayed on the display of the computer system;
   d) means for manipulating with the graphic object controller the selected first object displayed on the display of the computer system;
   e) means for providing an alignment field gradient emanating from the second object displayed on the display of the computer system; and,
   f) means for aligning the manipulated first object displayed on the display of the computer system with the second object displayed on the display of the computer system wherein when the manipulated first object is manipulated with the graphic object controller to within a first predetermined distance from the second object the displayed location of the manipulated first object on the display of the computer system is gradually shifted away from the cursor position and towards the displayed location of the second object on the display of the computer system and when the manipulated first object is manipulated with the graphic object controller to within a second predetermined distance from the second object the displayed location of the manipulated first object on the display of the computer system is gradually shifted away from the cursor position and into alignment with the displayed location of the second object on the display of the computer system.

* * * * *